(12) United States Patent
Bergström

(10) Patent No.: US 11,122,619 B2
(45) Date of Patent: Sep. 14, 2021

(54) CHANNEL ACCESS PRIORITY CLASS SELECTION

(71) Applicant: TELEFONAKTIEBOLAGET LM ERICSSON (PUBL), Stockholm (SE)

(72) Inventor: Mattias Bergström, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 338 days.

(21) Appl. No.: 16/088,355

(22) PCT Filed: Mar. 21, 2017

(86) PCT No.: PCT/IB2017/051637
§ 371 (c)(1),
(2) Date: Sep. 25, 2018

(87) PCT Pub. No.: WO2017/163185
PCT Pub. Date: Sep. 28, 2017

(65) Prior Publication Data
US 2020/0314895 A1    Oct. 1, 2020

Related U.S. Application Data

(60) Provisional application No. 62/313,240, filed on Mar. 25, 2016.

(51) Int. Cl.
| H04W 4/00 | (2018.01) |
| H04W 74/08 | (2009.01) |
| H04W 28/02 | (2009.01) |
| H04W 74/00 | (2009.01) |
| H04W 16/14 | (2009.01) |

(52) U.S. Cl.
CPC ... *H04W 74/0808* (2013.01); *H04W 28/0268* (2013.01); *H04W 74/006* (2013.01); *H04W 16/14* (2013.01)

(58) Field of Classification Search
None
See application file for complete search history.

(56) References Cited

U.S. PATENT DOCUMENTS

| 2017/0231004 A1* | 8/2017 | Babaei | H04W 74/0808 |
| 2017/0238342 A1* | 8/2017 | Yang | H04W 72/087 370/329 |
| 2017/0257852 A1* | 9/2017 | Wu | H04W 72/0453 |
| 2017/0359808 A1* | 12/2017 | Dinan | H04W 72/0446 |
| 2018/0007716 A1* | 1/2018 | Wu | H04W 74/0833 |
| 2018/0041996 A1* | 2/2018 | Ye | H04W 72/042 |
| 2019/0053273 A1* | 2/2019 | Kim | H04W 74/0833 |

OTHER PUBLICATIONS

LG Electronics, LBT schemes in LAA UL, R1-160630, 3GPP TSG RAN WG1 meeting #84, St Julian's, Malta, Feb. 15-19, 2016.
Mediatek Inc., Uplink channel access in LAA, R1-160976, 3GPP TSG RAN WG1 Meeting #84, St Julian's, Malta, Feb. 15-19, 2016.
ETRI, DL LBT priority classes in LAA, R2-156267, 3GPP TSG RAN WG2 #92, Anaheim, USA, Nov. 16-20, 2015.

* cited by examiner

*Primary Examiner* — Clemence S Han

(57) ABSTRACT

According to certain embodiments, a method in a wireless device comprises determining a mapping between one or more types of traffic and one or more classes and using the mapping to determine which of the classes to use during a procedure for determining whether the wireless device can transmit in a channel. The method further comprises performing the procedure for determining whether the wireless device can transmit in the channel.

44 Claims, 13 Drawing Sheets

400

402 — UE determines that a transmission includes a first MAC CE associated with a first CAPC and a second MAC CE associated with a second CAPC.

404 — The UE determines whether the first CAPC or the second CAPC has higher priority.

406 — The UE applies the higher priority of the first CAPC and the second CAPC to the transmission.

CHANNEL ACCESS PRIORITY CLASS SELECTION

This application is a 371 of International Application No. PCT/IB2017/051637, filed Mar. 21, 2017, which claims the benefit of U.S. Provisional Application No. 62/313,240, filed Mar. 25, 2016, the disclosures of which are fully incorporated herein by reference.

TECHNICAL FIELD

Particular embodiments relate generally to wireless communications and more particularly to Channel Access Priority Class selection.

BACKGROUND

Particular embodiments relate generally to wireless communications. The following provides an overview of the concepts of Quality of Service Class Identifier (QCI), Carrier Aggregation (CA), and Licensed Assisted Access (LAA) within the field of wireless communications.

Quality of Service Class Identifier (QCI)

A QCI identifies which Quality of Service (QoS) class certain traffic is associated with. For example, a set of predefined QCIs are standardized within the 3rd Generation Partnership Project (3GPP). These are found in 3GPP Technical Specification (TS) 23.203 v 13.6.0. QoS characteristics are defined for each class. Examples of QoS characteristics may include an upper bound for the Packet Delay Budget (which is an indication of an acceptable length of time for the packet to take from transmission to reception), an upper bound for the Packet Error Loss Rate (which indicates an upper bound of the ratio of packets which can be erroneous/lost), etc.

In addition to the standardized QCIs there are a set of non-standardized (or operator specific) QCIs. These QCIs may be associated with any type of traffic. It is up to the operator to decide which traffic to associate with non-standardized QCIs.

Carrier Aggregation

The Long Term Evolution (LTE) specifications have been standardized, supporting Component Carrier (CC) bandwidths up to 20 MHz (which is the maximal LTE Rel-8 carrier bandwidth). In LTE, operation with bandwidth wider than 20 MHz is possible and appears as a number of LTE carriers to an LTE terminal or user equipment (the terms terminal and user equipment (UE) are used interchangeably throughout this document).

Figure 1:
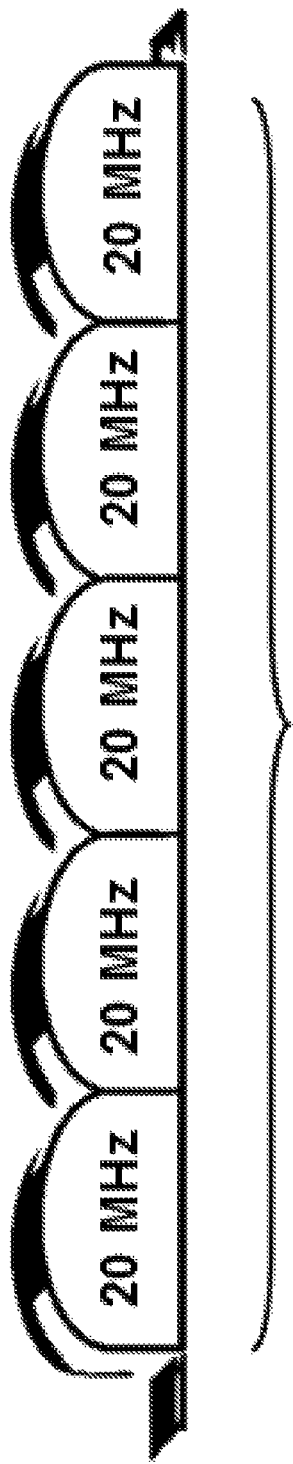

The straightforward way to obtain wider bandwidth would be by means of Carrier Aggregation (CA). CA implies that an LTE Rel-10 terminal can receive multiple CCs, where the CC has, or at least has the possibility to have, the same structure as a Rel-8 carrier. FIG. 1 illustrates an example of carrier aggregation that aggregates five bandwidths of 20 MHz each to obtain an aggregated bandwidth of 100 MHz. The LTE standard supports up to 5 aggregated carriers where each carrier is limited in the RF specifications to have one of six bandwidths, namely 6, 15, 25, 50, 75, or 100 RB (corresponding to 1.4, 3, 5, 10, 15, and 20 MHz respectively).

The number of aggregated CCs as well as the bandwidth of the individual CC may be different for uplink (UL) and downlink (DL). A symmetric configuration refers to the case where the number of CCs in downlink and uplink is the same, whereas an asymmetric configuration refers to the case that the number of CCs is different. It is important to note that the number of CCs configured in the network may be different from the number of CCs seen by a terminal. For example, a terminal may support more downlink CCs than uplink CCs, even though the network offers the same number of uplink and downlink CCs.

During initial access, an LTE CA-capable terminal behaves similar to a terminal that is not capable of CA. Upon successful connection to the network a terminal may— depending on its own capabilities and the network—be configured with additional CCs in the UL and DL. Configuration is based on radio resource control (RRC). Due to the heavy signaling and rather slow speed of RRC signaling, it is envisioned that a terminal may be configured with multiple CCs even though not all of them are currently used. If a terminal is activated on multiple CCs this would imply it has to monitor all DL CCs for the Physical Downlink Control Channel (PDCCH) and the Physical Downlink Shared Channel (PDSCH). This implies a wider receiver bandwidth, higher sampling rates, etc. resulting in high power consumption.

In CA, the terminal is configured with a primary CC (or cell or Serving cell) which is referred to as the Primary Cell or PCell. The PCell is particularly important, for example, due to control signaling that is signaled on this cell and due to the UE performing the monitoring of the radio quality on the PCell. A CA capable terminal can, as explained above, also be configured with additional carriers (or cells or serving cells) which are referred to as Secondary Cells (SCells).

Licensed Assisted Access (LAA)

To further improve the performance of LTE systems, 3GPP has started a study on how to enable the use of LTE in unlicensed spectrum which is referred to as Licensed Assisted Access (LAA). As unlicensed spectrum can never match the qualities of licensed spectrum, the intention with LAA is to apply carrier aggregation and use a secondary carrier in an unlicensed band, while having a primary carrier in a licensed band. This will then ensure that the reliability associated with licensed carriers can be enjoyed for the primary carrier and only secondary carriers are used in unlicensed bands.

(a) Listen-Before-Talk

To operate in unlicensed bands one needs to obey certain rules. One such rule is that a transmitter needs to listen on the carrier before one starts to transmit. If the medium is free the transmitter can transmit, while if the medium is busy (e.g., some other node is transmitting), the transmitter needs to suppress (or "drop" or "refrain from performing") the transmission and the transmitter can try again at a later time. This is referred to as listen before talk (LBT).

Due to LBT, a transmission in an unlicensed band may be delayed until the medium becomes free again. The delay may appear random in the case where there is no coordination between the transmitting nodes (which often is the case).

(b) Channel Access Priority Class

Table 1 below lists the Channel Access Priority Classes that have been defined by 3GPP. The difference between the classes is the range of possible contention windows (defined by $CW_{min,p}$ and $CW_{max,p}$), the number of CCA slots in the window (defined by $m_p$), and Maximum Channel Occupancy Time ($T_{mcot,p}$).

TABLE 1

Channel Access Priority Classes

| Class (p) | $m_P$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A priority class with a lower number (as compared to one with a higher number) has a higher chance of acquiring the channel because the contention windows (CWs) have shorter duration. For example, using class 1 has a higher likelihood of grabbing the channel compared to class 3. However, using a priority class with a low number allows the transmitter to use the channel for a shorter period of time before it needs to give another transmitter the chance to transmit.

When the eNodeB (eNB) transmits in unlicensed spectrum and applies LBT, the eNB may select which Channel Access Priority Class to apply based on the QCI value of the traffic which is transmitted. 3GPP has defined a recommended mapping of which Channel Access Priority Class should be applied for each of the standardized QCIs.

SUMMARY

With the introduction of LAA in the uplink, the UE is able to start transmitting in unlicensed spectrum in the uplink. The UE should then select between the Channel Access Priority Classes. What differs between these different classes is the likelihood of acquiring the channel and hence the chances to transmit. Additionally the different classes allows for different transmission duration, i.e., using different channels allows the transmitter to transmit for different amounts of time before allowing another entity to attempt transmitting. LAA is supposed to ensure fair co-existence between different systems (e.g., between different terminals). Thus, it is important that the Channel Access Priority Classes are selected in a manner that allows fair co-existence. This might not be achieved by allowing the UEs to autonomously select which Channel Access Priority Class to apply.

Further since the operator specific QCIs are not defined in any specifications, it may be that a certain QCI is used for a delay tolerant type of traffic in one operator's network and used for a delay sensitive type of traffic in another operator's network. Thus, a UE which may work well (i.e., select Channel Access Priority Classes in a suitable manner) in a first network may not work well in another network.

Certain embodiments may provide a solution to one or more of the problems described above. First, in certain embodiments, a method in a network node comprises determining a mapping between one or more types of traffic and one or more classes and communicating an indicator to a wireless device. The indicator indicates to use the mapping to determine which of the classes to use during a procedure for determining whether the wireless device can transmit in a channel. In some embodiments, the indicator is communicated in response to determining to override a default class.

Second, in certain embodiments, a network node comprises processing circuitry operable to determine a mapping between one or more types of traffic and one or more classes and to communicate an indicator to a wireless device. The indicator indicates to use the mapping to determine which of the classes to use during a procedure for determining whether the wireless device can transmit in a channel. In some embodiments, the indicator is communicated in response to determining to override a default class.

Third, in certain embodiments, a computer program product comprises a non-transitory computer readable storage medium having computer readable program code embodied in the medium. When executed by a processor of a network node, the program code causes the network node to perform operations. The operations comprise determining a mapping between one or more types of traffic and one or more classes and communicating an indicator to a wireless device. The indicator indicates to use the mapping to determine which of the classes to use during a procedure for determining whether the wireless device can transmit in a channel. In some embodiments, the indicator is communicated in response to determining to override a default class.

Fourth, in certain embodiments, a method in a wireless device, comprises determining a mapping between one or more types of traffic and one or more classes and using the mapping to determine which of the classes to use during a procedure for determining whether the wireless device can transmit in a channel. The method further comprises performing the procedure for determining whether the wireless device can transmit in the channel. In certain embodiments, the mapping is determined at least in part based on an indicator received from a network node.

Fifth, in certain embodiments, a wireless device comprises processing circuitry operable to determine a mapping between one or more types of traffic and one or more classes and to use the mapping to determine which of the classes to use during a procedure for determining whether the wireless device can transmit in a channel. The processing circuitry is further operable to perform the procedure for determining whether the wireless device can transmit in the channel. In certain embodiments, the mapping is determined at least in part based on an indicator received from a network node.

Sixth, in certain embodiments, a computer program product comprises a non-transitory computer readable storage medium having computer readable program code embodied in the medium. When executed by a processor of a wireless device, the program code causes the wireless device to perform operations. The operations comprise determining a mapping between one or more types of traffic and one or more classes and using the mapping to determine which of the classes to use during a procedure for determining whether the wireless device can transmit in a channel. The operations further comprise performing the procedure for determining whether the wireless device can transmit in the channel. In certain embodiments, the mapping is determined at least in part based on an indicator received from a network node.

In any of the first through sixth embodiments described immediately above, certain embodiments may comprise one or more of the following additional features. For example, in certain embodiments the class is a channel access priority class. In certain embodiments, the mapping associates the one or more classes with one or more bearers, logical channels, or logical channel groups. In certain embodiments, the mapping associates the one or more classes with one or more bearer types. In certain embodiments, the mapping is determined based on quality of service (QoS) requirements. In certain embodiments, the one or more classes comprises a first class that the mapping associates with a first type of traffic and a second class that the mapping associates with a second type of traffic, and the first class provides a higher likelihood of acquiring the channel than the second class.

Further, the indicator can indicate to use the first class for a transmission that includes both the first type of traffic and the second type of traffic.

As further examples of additional features of any of the first through sixth embodiments, in certain embodiments, the mapping indicates which of the classes to use based on whether a transmission includes a medium access control (MAC) control element (CE). In certain embodiments, the mapping indicates which of the classes to use based on whether a transmission includes a certain type of medium access control (MAC) control element (CE). In certain embodiments, the mapping indicates which of the classes to use based on whether a transmission includes a radio link control (RLC) protocol data unit (PDU). In certain embodiments, the mapping indicates which of the classes to use based on whether a transmission includes a packet data convergence protocol (PDCP) control protocol data unit (PDU).

As further examples of additional features of any of the first through sixth embodiments, in certain embodiments, the procedure is a listen-before-talk procedure. Further, the listen-before-talk operation can be configured for uplink transmissions that use unlicensed spectrum. As an example, the listen-before-talk operation can be configured for uplink transmissions that use a secondary carrier of a carrier aggregation configuration and the secondary carrier can be configured for the uplink transmissions that use unlicensed spectrum. In certain embodiments, the indicator is communicated via radio resource control (RRC) signaling.

Certain embodiments of the disclosure may provide one or more technical advantages. The above-described first through third embodiments may provide certain technical advantages related to the operation of a network node. For example, certain embodiments enable the network node (e.g., eNB) to ensure that different wireless devices (e.g., UEs) in the network apply the same methods when selecting the Channel Access Priority Classes. This ensures that the different UEs are sharing the medium in a fair manner. The above-described fourth through sixth embodiments may provide certain technical advantages related to the operation of a wireless device. As an example, in one set of embodiments, the UE/wireless device will select the Channel Access Priority Class for a transmission considering whether Medium Access Control (MAC) Control Elements (CEs), RLC control Protocol Data Units (PDUs), and/or Packet Data Convergence Protocol (PDCP) control PDUs are included in the transmission. The UE's selection of the Channel Access Priority Class can also consider signaling from the eNB/network node. As another example, in another set of embodiments, the UE selects the Channel Access Priority Class for bearers based on the QCI and indications from the eNB. Further, in certain embodiments, when transmitting in unlicensed spectrum, the UE determines which Channel Access Priority Class to apply based on which DRBs are transmitted including their associated QCI values as well as based on whether and which SRBs, MAC CEs, RLC control PDUs and PDCP control PDUs are transmitted. Some embodiments may benefit from some, none, or all of these advantages. Other technical advantages may be readily ascertained by one of ordinary skill in the art.

BRIEF DESCRIPTION

FIG. 1 illustrates an example of carrier aggregation in which the bandwidth of multiple carriers is aggregated to support a wider bandwidth.

FIGS. 2-4 and 8 provide flow charts illustrating examples of methods in a wireless device for determining a class to use during a procedure, in accordance with certain embodiments of the present disclosure.

Figure 5:
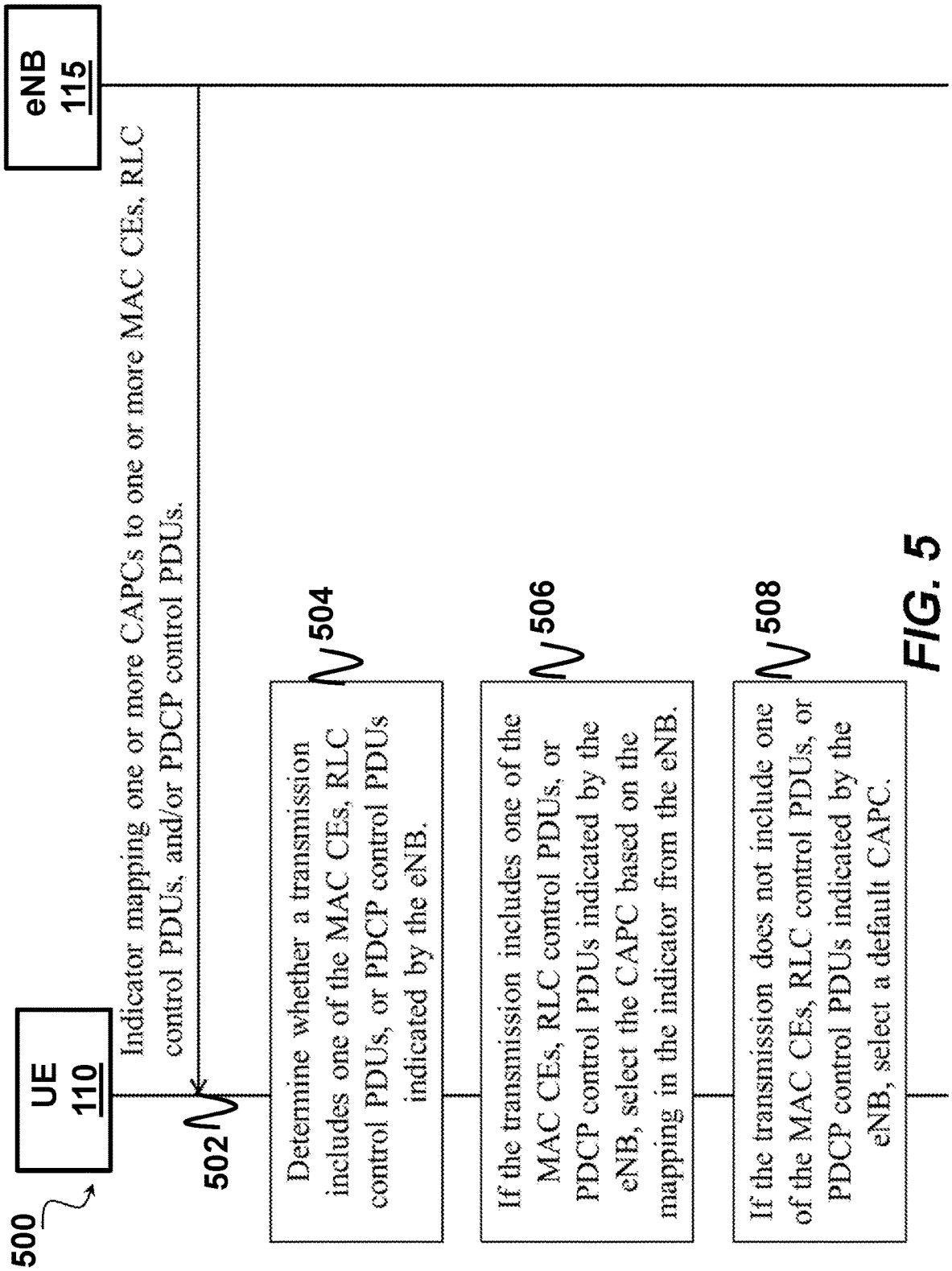
Figure 6:
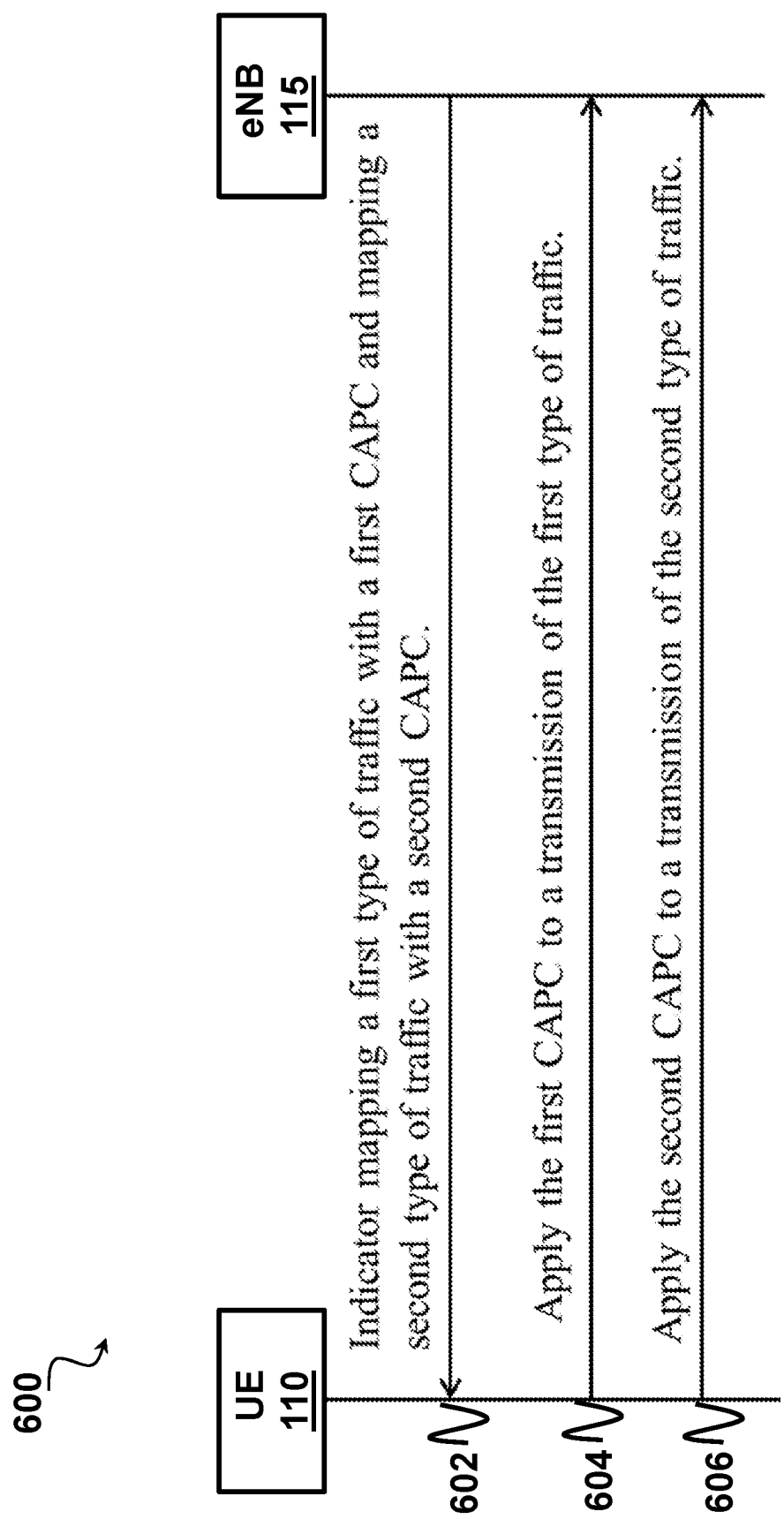

FIGS. 5-6 provide signal flow diagrams illustrating examples of a network node indicating a mapping to a wireless device, in accordance with certain embodiments of the present disclosure.

Figure 7:
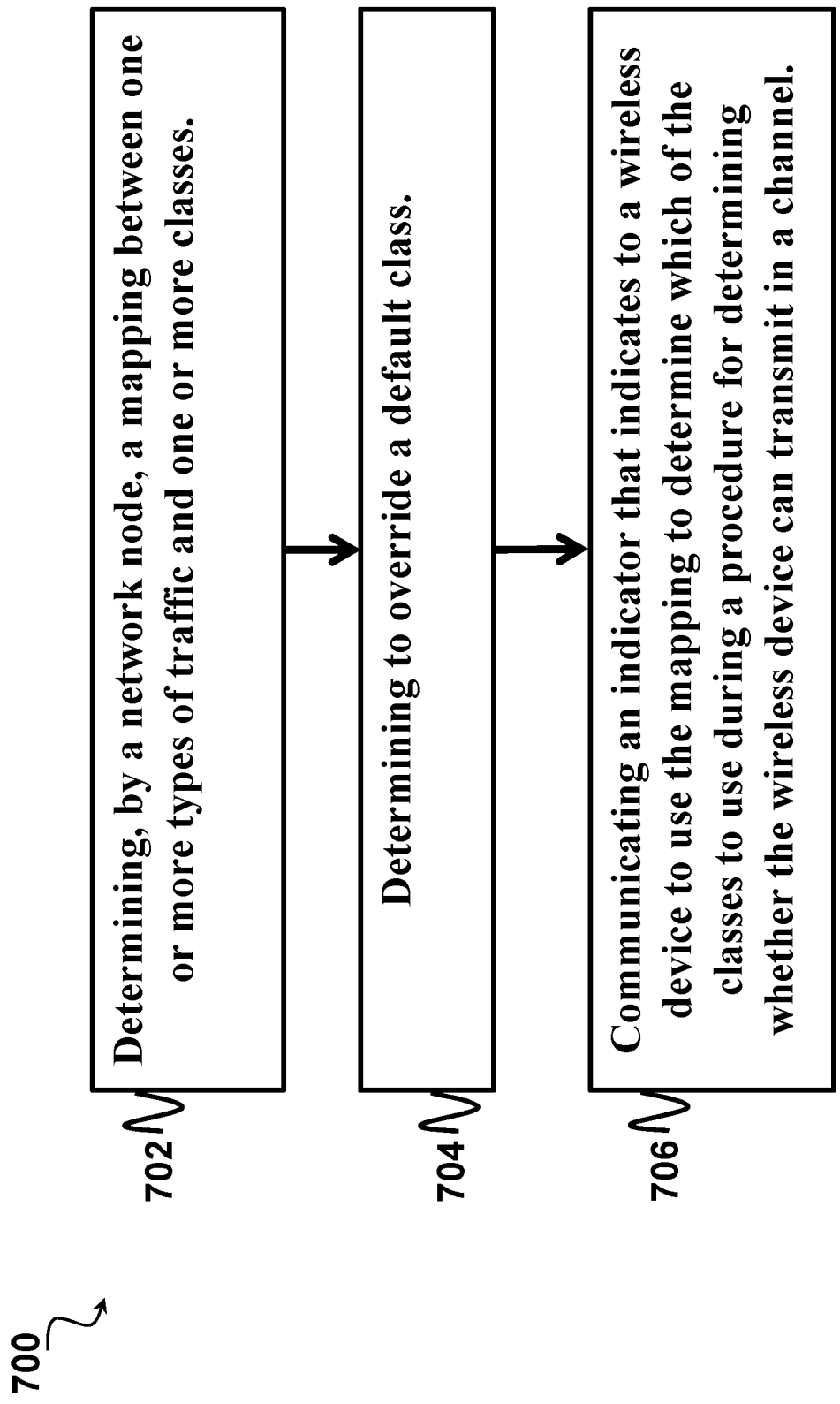

FIG. 7 provides a flow chart illustrating an example of a method in a network node for indicating a mapping between one or more types of traffic and one or more classes, in accordance with certain embodiments of the present disclosure.

Figure 9:
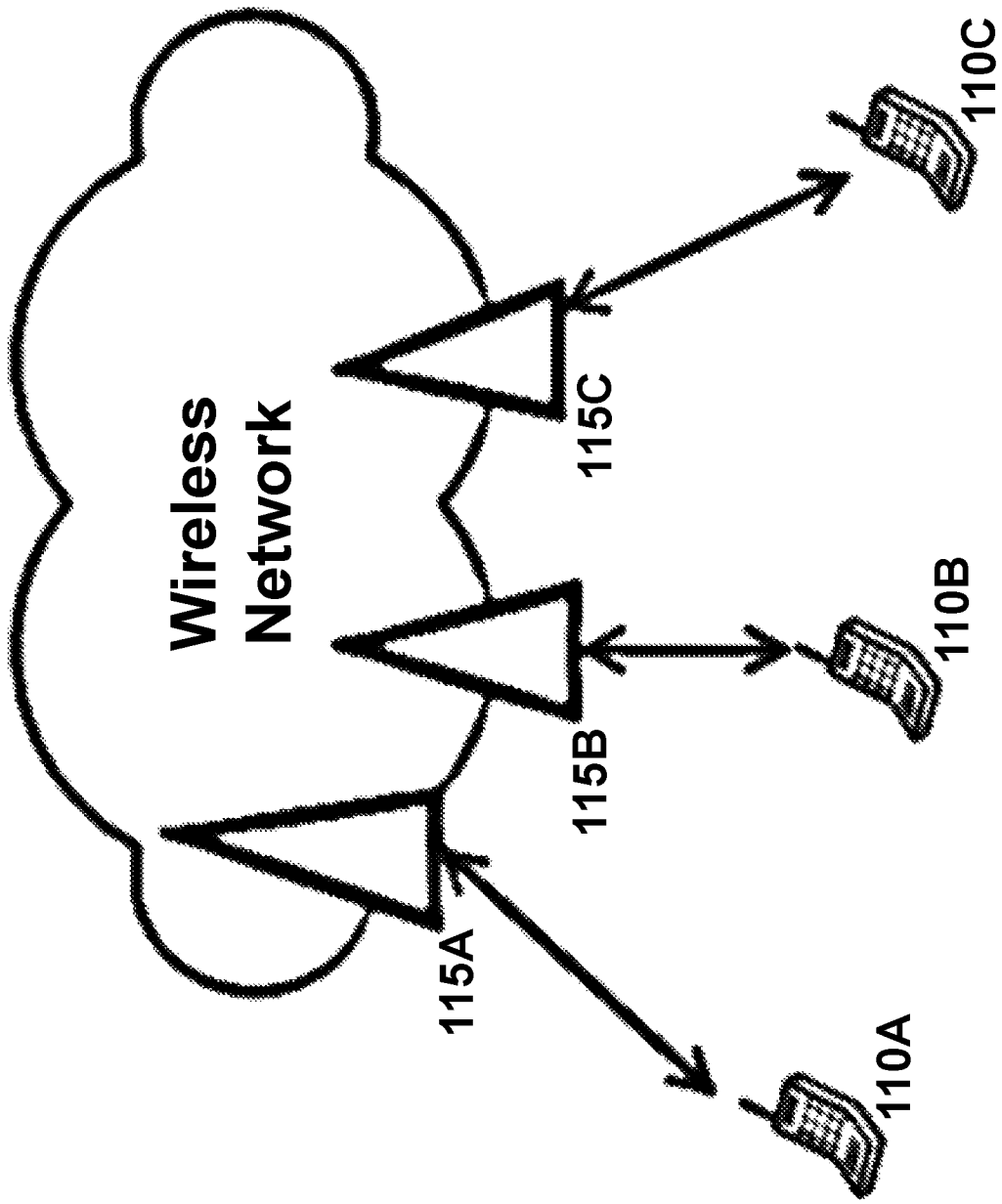

FIG. 9 provides a block diagram illustrating an example of a wireless network, in accordance with certain embodiments of the present disclosure.

Figure 10:
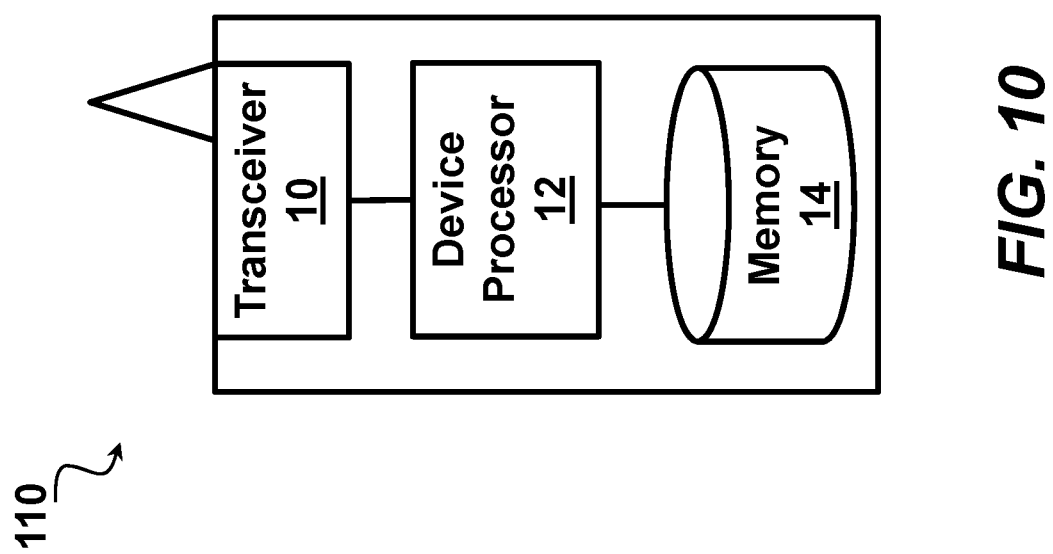

FIG. 10 provides a block diagram illustrating an example of a wireless device, in accordance with certain embodiments of the present disclosure. The wireless device may be referred to interchangeably herein as a terminal or UE.

Figure 11:
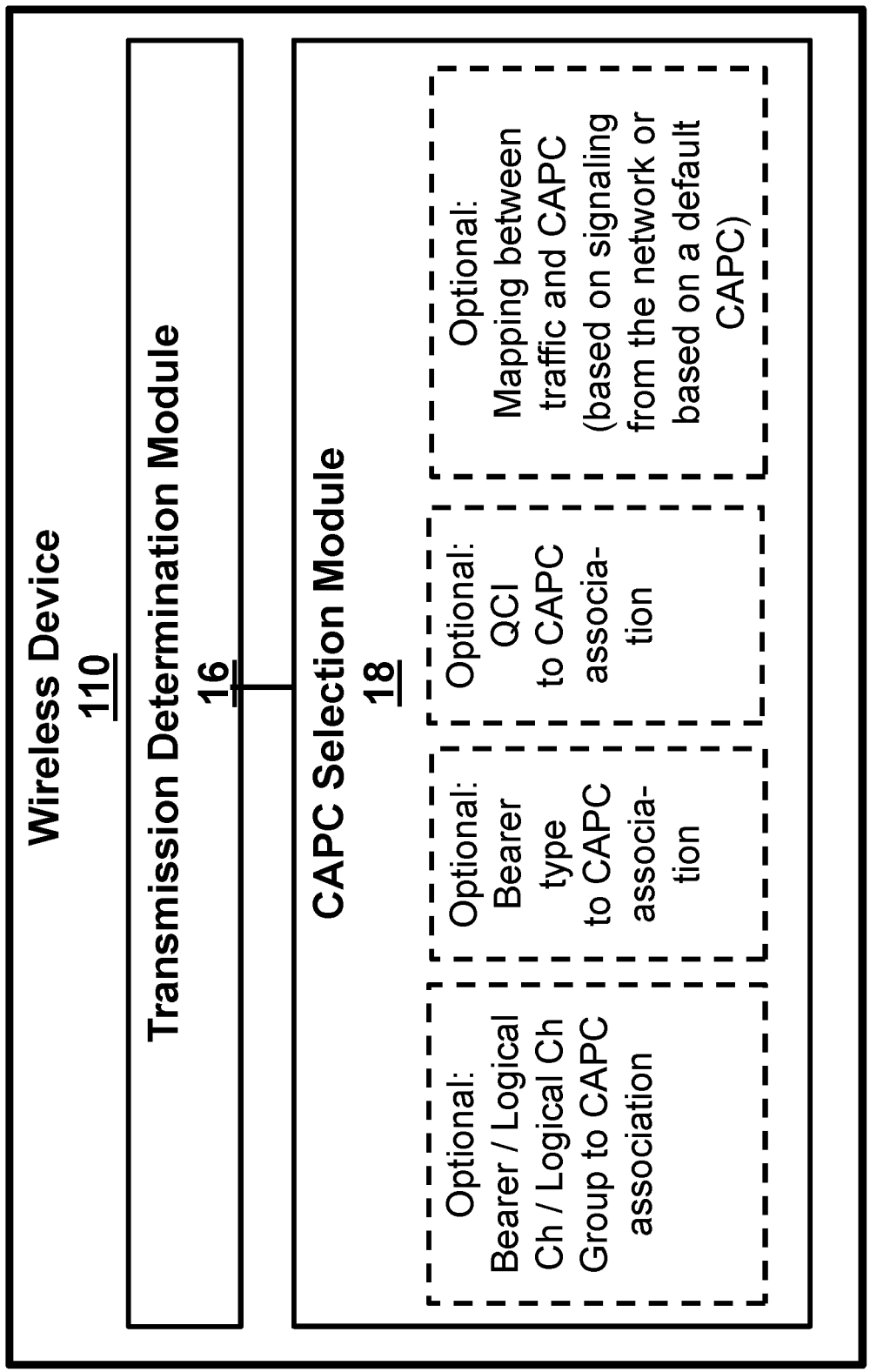

FIG. 11 provides a block diagram illustrating an example of components of a wireless device of FIG. 10, in accordance with certain embodiments of the present disclosure.

Figure 12:
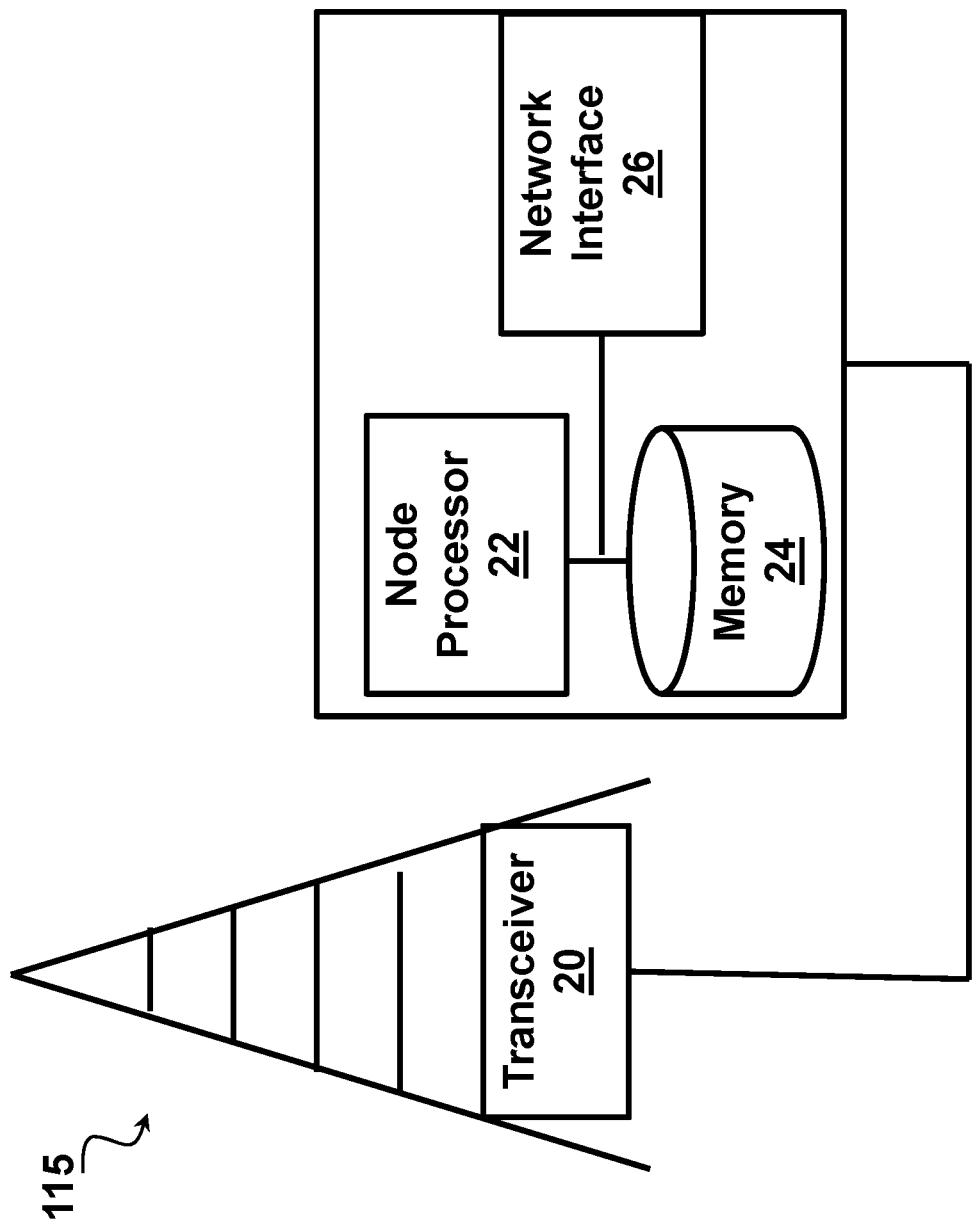

FIG. 12 provides a block diagram illustrating an example of a network node, in accordance with certain embodiments of the present disclosure. The network node may be referred to interchangeably herein as an eNB, base station, or radio node.

Figure 13:
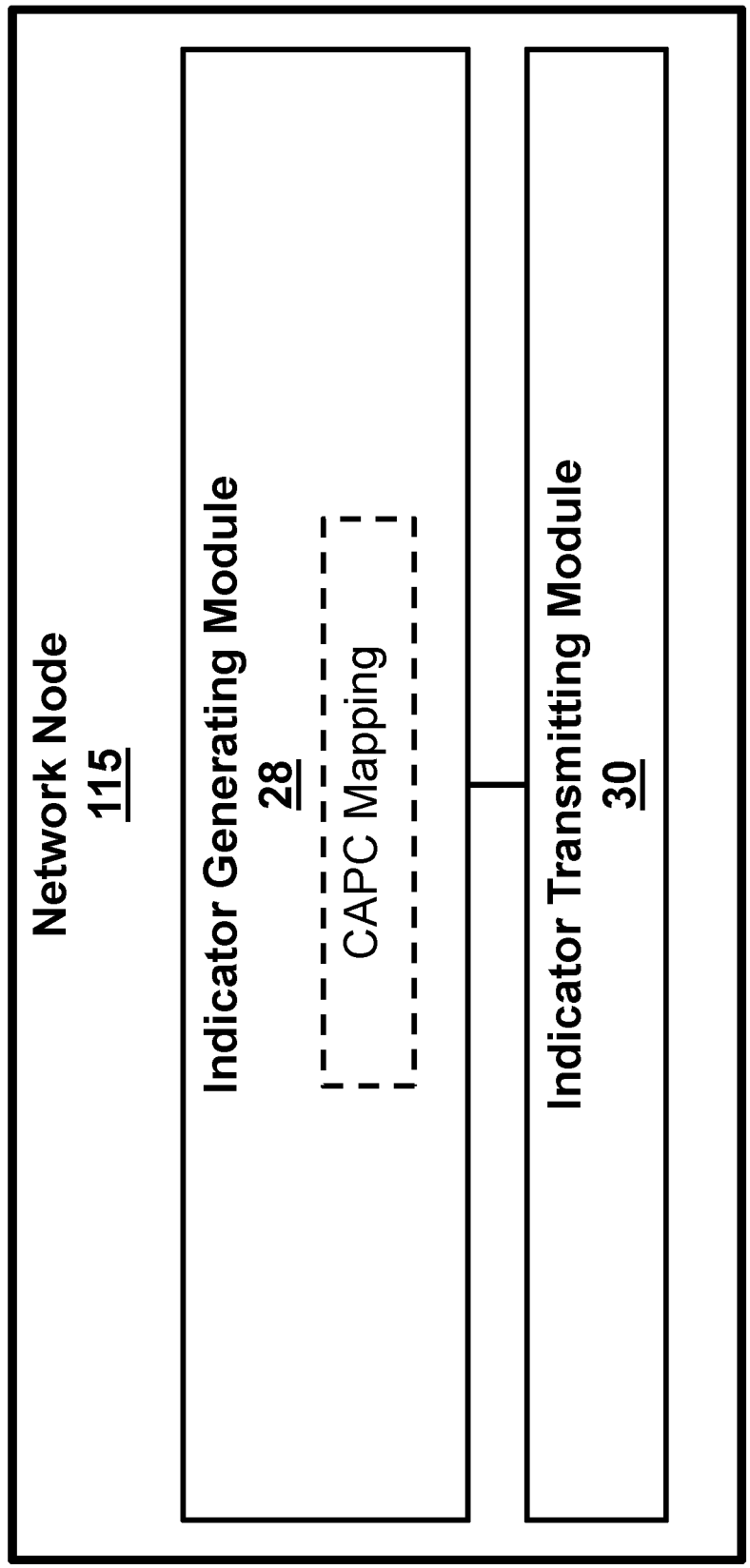

FIG. 13 provides a block diagram illustrating an example of components of the network node of FIG. 12, in accordance with certain embodiments of the present disclosure.

DETAILED DESCRIPTION

A wireless device that desires to send transmissions to a network node over a channel may attempt to acquire the channel according to a class. Different classes have different likelihoods of acquiring the channel and hence different chances of being able to transmit. Additionally the different classes allow for, but do not require, different transmission durations (e.g., different classes may use the same transmission durations or different transmission durations). If wireless devices all attempt to use the same class, it may be difficult to ensure fair access to the network. Accordingly, certain embodiments of the present disclosure may provide systems and methods for selecting a class to be used by the wireless device depending on the traffic to be transmitted by the wireless device. For example, certain embodiments of this disclosure will describe how a UE selects Channel Access Priority Classes when performing UL transmissions. The Channel Access Priority Classes may be referred herein as CAPC for brevity. Other terms used to refer to the Channel Access Priority Classes may include, for example, LBT Priority Classes, Priority Classes, or just Classes. Certain embodiments may help to ensure fair co-existence between different wireless devices. Certain embodiments may be well-suited to listen-before-talk operation in unlicensed spectrum.

As further discussed below, in certain embodiments, the CAPC is determined based on whether the packets contain MAC CEs, RLC control PDUs, and/or PDCP control PDUs. As an example, MAC CEs may be sent from the UE to the eNB and from the eNB to the UE (or in case of device-to-device communication, between a first UE and a second UE). The MAC CEs contain control information. An example of a MAC CE is a Buffer Status Report that contains information regarding the buffer sizes in the UE.

Buffer Status Reports are used by the eNB to determine whether to schedule the UE for transmission and, if so, with how many resources. Another example of a MAC CE is a Power Headroom Report that provides the eNB with information about how much power is available in the UE and hence how many resources the eNB can schedule for the UE. Further, the RLC-layer and PDCP-layer also have control PDUs used to provide control information related to which packets have been received and which have not.

Figure 2:
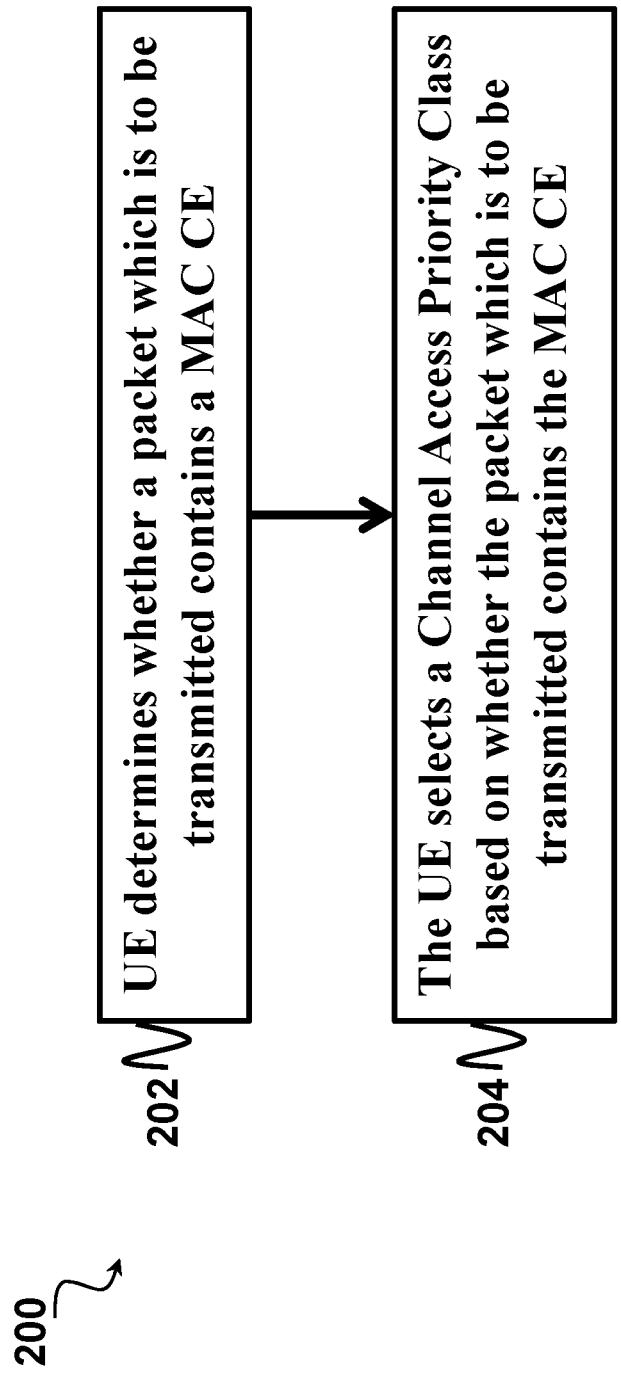

FIG. 2 provides a flow chart illustrating an example method 200 in a wireless device (UE 110) for determining a class to use during a procedure, in accordance with certain embodiments of the present disclosure. In FIG. 2, the UE 110 selects the Channel Access Priority Class used for a transmission based on whether a MAC CE is to be included in the transmission. The UE 110 may determine whether a packet which is to be transmitted contains a MAC CE (step 202) and, based on this, select which CAPC to use for the transmission (step 204).

Figure 3:
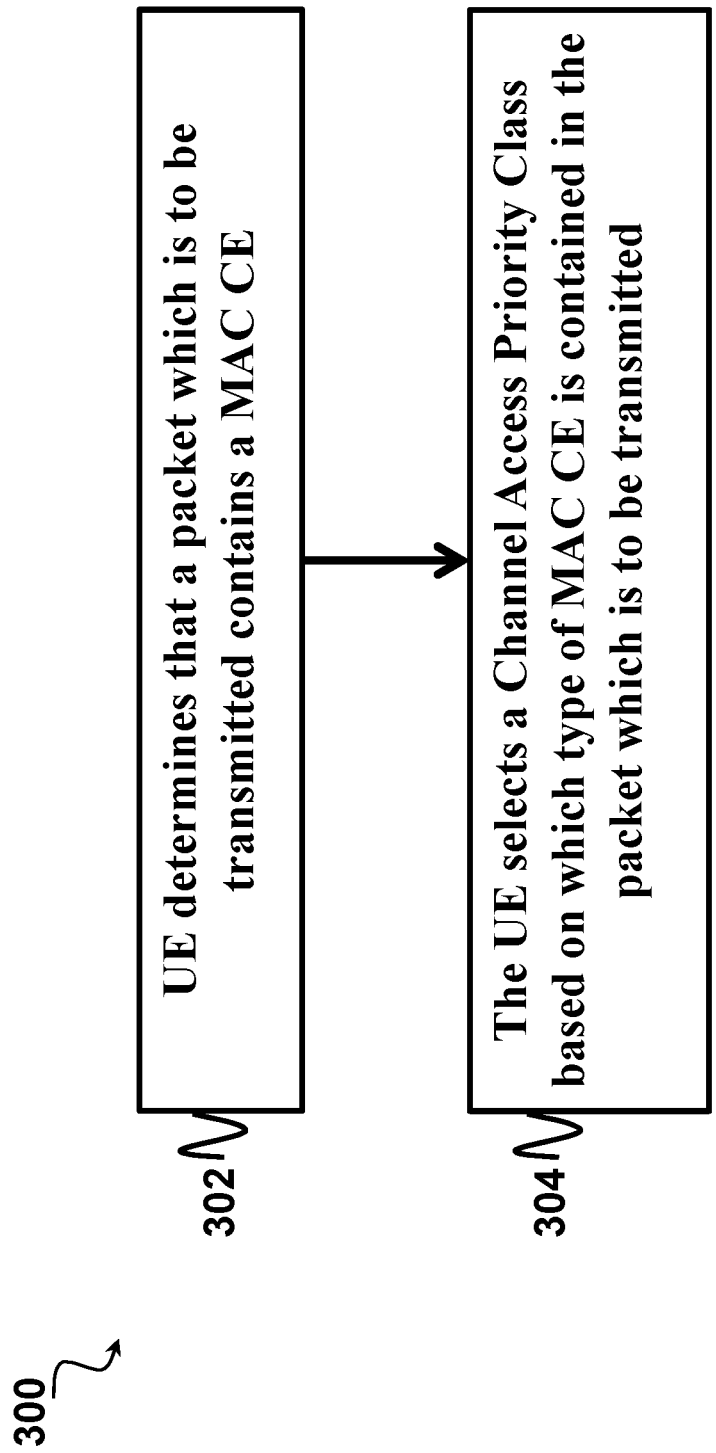

FIG. 3 illustrates a method 300 that provides one alternative for the embodiment of FIG. 2. In FIG. 3, the UE may consider which type of MAC CE the transmission contains when selecting the CAPC used for the transmission. At step 302, the UE 110 determines that a packet which is to be transmitted contains a MAC CE. At step 304, the UE 110 selects the CAPC based on which type of MAC CE is contained in the packet which is to be transmitted. This allows the use of different CAPC for transmissions of different types of MAC CEs. Thus, different types of MAC CEs can be given different priorities in order to ensure that some high priority MAC CEs are more likely to be transmitted quickly compared to some MAC CEs with lower priority.

Figure 4:
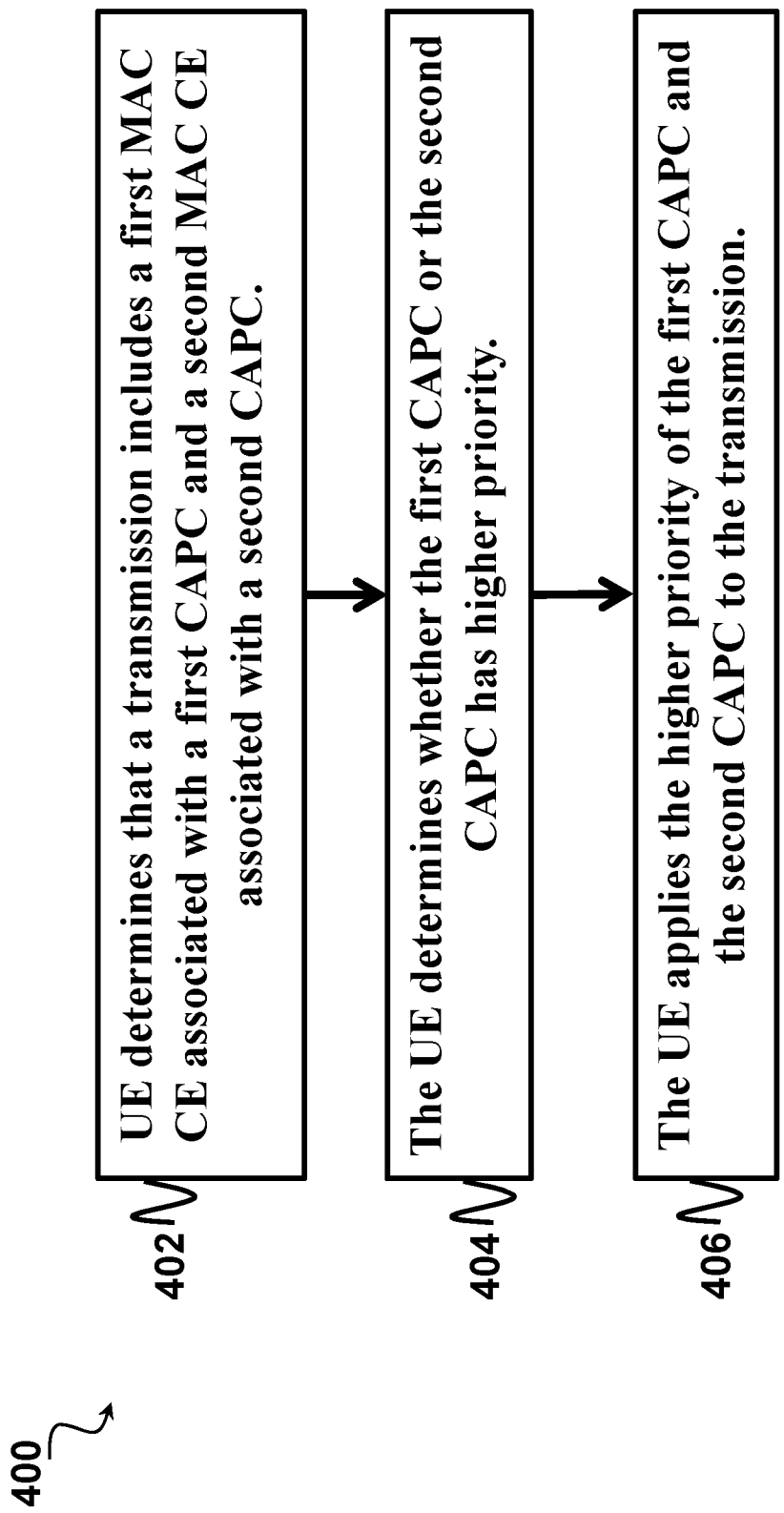

FIG. 4 illustrates a method 400 that provides another alternative for the embodiment of FIG. 2. In the case that the UE 110 is to transmit several different MAC CEs that are associated with different CAPCs, the UE 110 applies the CAPC with the highest priority for this transmission. That is, the UE 110 applies the CAPC with the lowest index, which may be the CAPC that ensures a higher probability of grabbing the channel. For example, FIG. 4 illustrates an embodiment in which the UE 110 determines that a transmission includes two MAC CEs associated with two CAPCs (i.e., a first MAC CE associated with a first CAPC and a second MAC CE associated with a second CAPC). At step 404, the UE 110 determines whether the first CAPC or the second CAPC has higher priority. At step 406, the UE 110 applies the higher priority of the first CAPC and the second CAPC to the transmission. Thus, if the UE 110 is to transmit a MAC CE with CAPC 1 and a MAC CE with CAPC 2, the UE 110 would apply the most stringent CAPC (CAPC 1 in this example). This ensures that if the UE 110 is to transmit several MAC CEs in a transmission, the UE 110 would apply the CAPC for the MAC CE which has the most stringent delay requirements associated with them.

Similar to the example embodiments for the MAC CEs (e.g., FIGS. 2-4), it would also be possible that the UE 110 considers whether a transmission contains an RLC control PDU or a PDCP control PDU when determining which CAPC to apply when performing a transmission. Similar to the above the UE 110 may associate different CAPC with different control PDUs, for example, one CAPC with RLC control PDUs and another CAPC with PDCP control PDUs. Further granularity could also be obtained, for example, by associating a first PDCP control PDU type with a first CAPC and associating a second PDCP control PDU with a second CAPC. Similarly, a first RLC control PDU type could be associated with a first CAPC and a second RLC control PDU type could be associated with a second CAPC.

In certain embodiments, a MAC CEs, RLC control PDUs, and/or PDCP control PDUs may be mapped to CAPCs. For the purposes of example, the following will describe how a UE 110 determines the mapping between MAC CEs and CAPC. However it should be appreciated that the same methods may be applied to determine which CAPC applies for RLC control PDUs and/or PDCP control PDUs.

Which CAPC to apply for a packet with a MAC CE may be determined by the UE 110 based on a pre-configured rule, such as a rule defined in a specification. An example of such a rule is that transmissions containing MAC CEs should be transmitted using CAPC 1. Another example rule is that CAPC 1 should be applied when transmitting Buffer Status Report (BSR) MAC CEs, and CAPC 2 should be applied when transmitting Power Headroom Report (PHR) MAC CEs. More detailed rules would also be possible. As another example rule, the UE 110 would apply CAPC 1 for BSRs that indicate the status of the buffers used for transmissions to the eNB 115, however, the UE 110 would apply CAPC 2 for BSRs that indicate the status of the buffers used for transmissions to another UE 110 (i.e., "Sidelink BSRs").

Another possibility is that the eNB 115 indicates to the UE 110 a mapping between the CAPCs and MAC CEs. This mapping may be provided using Radio Resource Control (RRC) signaling. In case all MAC CEs are associated with the same CAPC, the eNB 115 may provide one indication. As an example, the existing RRC spec (3GPP TS 36.331 v13.0.0) can be modified so that the eNB 115 can indicate a new parameter, such as "channelAccessPriorityClassFor-MAC-CEs-r14" within a MAC-MainConfig information element. The "channelAccessPriorityClassForMAC-CEs-r14" is an integer-value from 1 to 4 in certain embodiments. The UE 110 would use the CAPC indicated by the eNB 115.

As discussed above, the UE 110 may apply different CAPC for different types of MAC CEs. The eNB 115 may indicate this by providing several CAPC values by sending one CAPC value per type of MAC CE or set of types of MAC CEs. To reduce signaling overhead the UE 110 may apply a default CAPC for a MAC CE in case the eNB 115 has not provided an explicit indication for a MAC CE. This allows the eNB 115 to omit that indication in case the default CAPC is considered suitable to use by the eNB.

As an example, the existing RRC spec (3GPP TS 36.331 v13.0.0) can be modified so that the eNB can indicate new parameters, such as "channelAccessPriorityClassForBSR-r14" and "channelAccessPriorityClassForPHR-r14," within a MAC-MainConfig information element, which provides the ability to set the CAPC for BSR MAC CEs independently of the CAPC for PHR MAC CEs.

FIG. 5 provides a signal flow diagram 500 illustrating an example of a network node (eNB 115) indicating a mapping to a wireless device (UE 110), in accordance with certain embodiments of the present disclosure. In particular, FIG. 5 illustrates an example of the eNB 115 indicating to the UE 110 a mapping between the CAPCs and MAC CEs, RLC control PDUs, and/or PDCP control PDUs. For example, at step 502, the eNB 115 communicates to UE 110 an indicator mapping one or more CAPCs to one or more MAC CEs, RLC control PDUs, and/or PDCP control PDUs. At step 504, the UE 110 determines whether a transmission includes one of the MAC CEs, RLC control PDUs, or PDCP control PDUs indicated by the eNB 115. At step 506, if the transmission includes one of the MAC CEs, RLC control PDUs, or PDCP control PDUs indicated by the eNB 115, the UE 110 selects the CAPC based on the mapping in the indicator from the eNB 115. At step 508, if the transmission does not include one of the MAC CEs, RLC control PDUs, or PDCP control PDUs indicated by the eNB 115, the UE 110 selects a default CAPC.

In certain embodiments, CAPC selection may depend on traffic content. In one embodiment the eNB provides a mapping to the UE indicating which CAPC the UE is to apply when transmitting data associated with a certain type of traffic. For example, the UE may associate traffic of a first type with a first CAPC (e.g., CAPC 1) and traffic of a second type with a second CAPC (e.g., CAPC 2). If the UE is to transmit the first type of traffic the UE would apply CAPC 1, and if the UE is to transmit traffic of the second type the UE would apply CAPC 2. FIG. 6 provides an example signal flow 600 in which a network node (eNB 115) indicates a mapping to a wireless device (UE 110) for two types of traffic, in accordance with certain embodiments of the disclosure. At step 602, the eNB 115 communicates an indicator mapping a first type of traffic with a first CAPC and mapping a second type of traffic with a second CAPC. At step 604, the UE 110 applies the first CAPC to a transmission of the first type of traffic. At step 606, the UE 110 applies the second CAPC to a transmission of the second type of traffic.

If transmission data is associated with several CAPCs, the UE 110 may apply the most stringent CAPC. For example, if data associated with CAPC 1 and data associated with CAPC 2 are to be transmitted at the same time, the UE 110 may select the most stringent CAPC. The most stringent CAPC refers to the CAPC which has the highest likelihood of the UE 110 being able to transmit quickly (e.g., CAPC 1).

There may be several possible ways of associating a transmission to a CAPC. Examples include (1) Bearer/ logical channel/logical channel group to CAPC association, (2) Bearer type to CAPC association, (3) QCI to CAPC association, and (4) Mapping between traffic and CAPC (e.g., based on signaling from the network or based on a default CAPC).

A first possible way of associating a transmission to a CAPC may be bearer/logical channel/logical channel group to CAPC association. One possible way of implementing this embodiment is to associate a CAPC with a certain bearer or logical channel or logical channel group. E.g., a first bearer (or type of bearer) may be associated with a first CAPC while a second bearer (or type of bearer) is associated with a second CAPC. For example the UE 110 may associate a Data Radio Bearer (DRB) 1 with CAPC 1 and a DRB 2 with a CAPC 3.

A second possible way of associating a transmission to a CAPC may be bearer type to CAPC association in which a certain type of bearer is associated with a certain CAPC. For example, the UE 110 may associate Signaling Radio Bearers (SRBs) with one CAPC and hence the UE 110 would, when it should perform a transmission, determine whether this transmission contains data of an SRB. Based on whether the transmission contains data of an SRB, the UE 110 determines which CAPC to apply. Thus, all signaling bearers would be associated with a certain CAPC. If higher granularity is needed, it would be possible to associate a certain SRB with a CAPC, for example, SRB0 is associated with a CAPC 1 and SRB1 and SRB2 are associated with CAPC 2.

A third possible way of associating a transmission to a CAPC may be QCI to CAPC association. For example, a first QCI is associated with a first CAPC and a second QCI is associated with a second CAPC. In one embodiment, traffic with a QCI value of 1 may be associated with CAPC 1 and traffic with a QCI value of 7 may be associated with a CAPC 2.

A fourth possible way of associating a transmission to a CAPC may be mapping between traffic and CAPC. The UE 110 may determine which CAPC to apply when transmitting certain traffic based on signaling from the network, e.g., the eNB 115. The eNB 115 may provide this mapping using RRC signaling.

In certain embodiments, an eNB 115 may use RRC signaling to indicate, per bearer, which CAPC to apply. As an example, a modification to the existing RRC spec (3GPP TS 36.331 v13.0.0) can be made in which an indicator named channelAccessPriorityClass-r14 is provided in both the information element used for configuring Signaling Radio Bearers (SRBs) and the information element used for configuring Data Radio Bearers (DRBs). That is, one channelAccessPriorityClass-r14 indicator may be associated with SRBs and another channelAccessPriorityClass-r14 indicator may be associated with DRBs in the foregoing example.

Note that it would also be possible to indicate that a certain logical channel or logical channel group is associated with a certain CAPC.

In one embodiment, the UE 110 applies a default CAPC for traffic in case the eNB 115 has not provided an explicit indication of which CAPC the UE 110 shall apply for this traffic. The default CAPC may be selected based on a pre-defined rule. The eNB 115 would then not need to explicitly indicate to the UE 110 which CAPC the UE 110 shall apply when transmitting traffic of this type as the UE 110 can determine which CAPC to apply based on the rule.

In one particular version of this embodiment the UE 110 applies a default CAPC to SRBs. As an example, apply CAPC 1 to SRBs, which increases the probability that the UE 110 can acquire the channel quickly and hence increases the likelihood of such traffic reaching the eNB 115 in a timely manner.

In one particular version of this embodiment the UE 110 determines a default CAPC for traffic based on QoS requirement of the traffic. In 3GPP networks there are certain QoS-classes which have been standardized; these have QCI values 1 to 9, 65, 66, 69 and 70. This means that the UE 110 could, according to this embodiment, determine which CAPC a bearer is associated with based on the QCI value associated with the bearer. So if the eNB 115 has not provided a CAPC-indication for a certain bearer, the UE 110 would determine the CAPC for this bearer based on the QCI-value associated with this bearer. If, for example, a bearer is associated with QCI value 7, the UE 110 would apply CAPC 2 for this bearer. If instead a bearer is associated with QCI value 8, the UE 110 would apply CAPC 3. This ensures that the eNB 115 does not need to report which CAPC a certain bearer is associated with in case the bearer is associated with QCI for which default mapping exists. However, if there is no established CAPC associated with a certain QCI, then the eNB 115 may need to provide an explicit indication of which CAPC should be used when transmitting data of this bearer.

FIG. 7 provides a flow chart illustrating an example of a method 700 in a network node 115 for indicating a mapping between one or more types of traffic and one or more classes, in accordance with certain embodiments of the present disclosure. At step 702, the network node 115 determines a mapping between one or more types of traffic and one or more classes, such as one or more channel access priority classes. As discussed above, there are a number of possible ways of associating a transmission with a class (such as a CAPC). As a first example, the mapping may associate the one or more classes with one or more bearers, logical channels, or logical channel groups. As a second example, the mapping associates the one or more classes with one or more bearer types. As a third example, the mapping is determined based on quality of service (QoS) requirements (such as according to a QCI to class association). The type of traffic that maps to a class may refer to any suitable type (or subtype) of traffic. For example, one type of traffic could be traffic containing a MAC CE. Or, the type of traffic could be more granular (e.g., one type of traffic could be traffic containing a MAC CE Buffer Status Report and another type of traffic could be traffic containing a MAC CE Power Headroom Report). Thus, a first bearer (such as a bearer containing a MAC CE Buffer Status Report) may have one mapping while a second bearer (such as a bearer containing a MAC CE Power Headroom Report) has another mapping even though both carry the same general "type" of traffic (such as MAC CE traffic).

In certain embodiments, the mapping associates a first class with a first type of traffic, a second class with a second type of traffic, and optionally an $N^{th}$ class with an $N^{th}$ type of traffic. In certain embodiments, the traffic type indicated by the mapping may be based on whether a transmission includes a medium access control (MAC) control element (CE), a certain type of medium access control (MAC) control element (CE) (such as a Buffer Status Report or a Power Headroom Report (PHR)), a radio link control (RLC) protocol data unit (PDU), and/or a packet data convergence protocol (PDCP) control protocol data unit (PDU).

At step 704, the network node 115 determines to override a default class. As described above, a UE 110 may determine a default class based on a pre-defined rule in case the network node 115 has not provided an explicit indication of a class to be used for the traffic type that the UE 110 intends to transmit. Network node 115 may determine to override the default class for any suitable reason. For example, network node 115 may determine to override the default class to help ensure fair co-existence between different wireless devices. Step 704 may be optional in certain embodiments, for example, if the UE 110 do not support a default class, network node 115 may simply provide the mapping without having to override any default class.

At step 706, network node 115 communicates an indicator to the UE 110. In certain embodiments, the indicator is communicated via radio resource control (RRC) signaling. The indicator indicates to the UE 110 to use the mapping to determine which class to use during a procedure that the UE 110 uses to determine if it can transmit in a channel, such as a listen-before-talk procedure. In certain embodiments, the listen-before-talk procedure can be configured for uplink transmissions that use unlicensed spectrum. As an example, the listen-before-talk procedure can be configured for uplink transmissions that use a secondary carrier of a carrier aggregation configuration and the secondary carrier can be configured for the uplink transmissions that use unlicensed spectrum. Additional examples of indicators are described above in FIG. 5 (step 502) and FIG. 6 (step 602).

In certain embodiments, the indicator can indicate to use the class of the highest priority traffic if the transmission includes multiple types of traffic. For example, for a transmission that includes both the first type of traffic that maps to the first class and the second type of traffic that maps to the second class, the indicator indicates to use the first class if the first class provides a higher likelihood of acquiring the channel than the second class. In certain embodiments, the UE 110 may use such an indicator when performing the method of FIG. 4.

Figure 8:
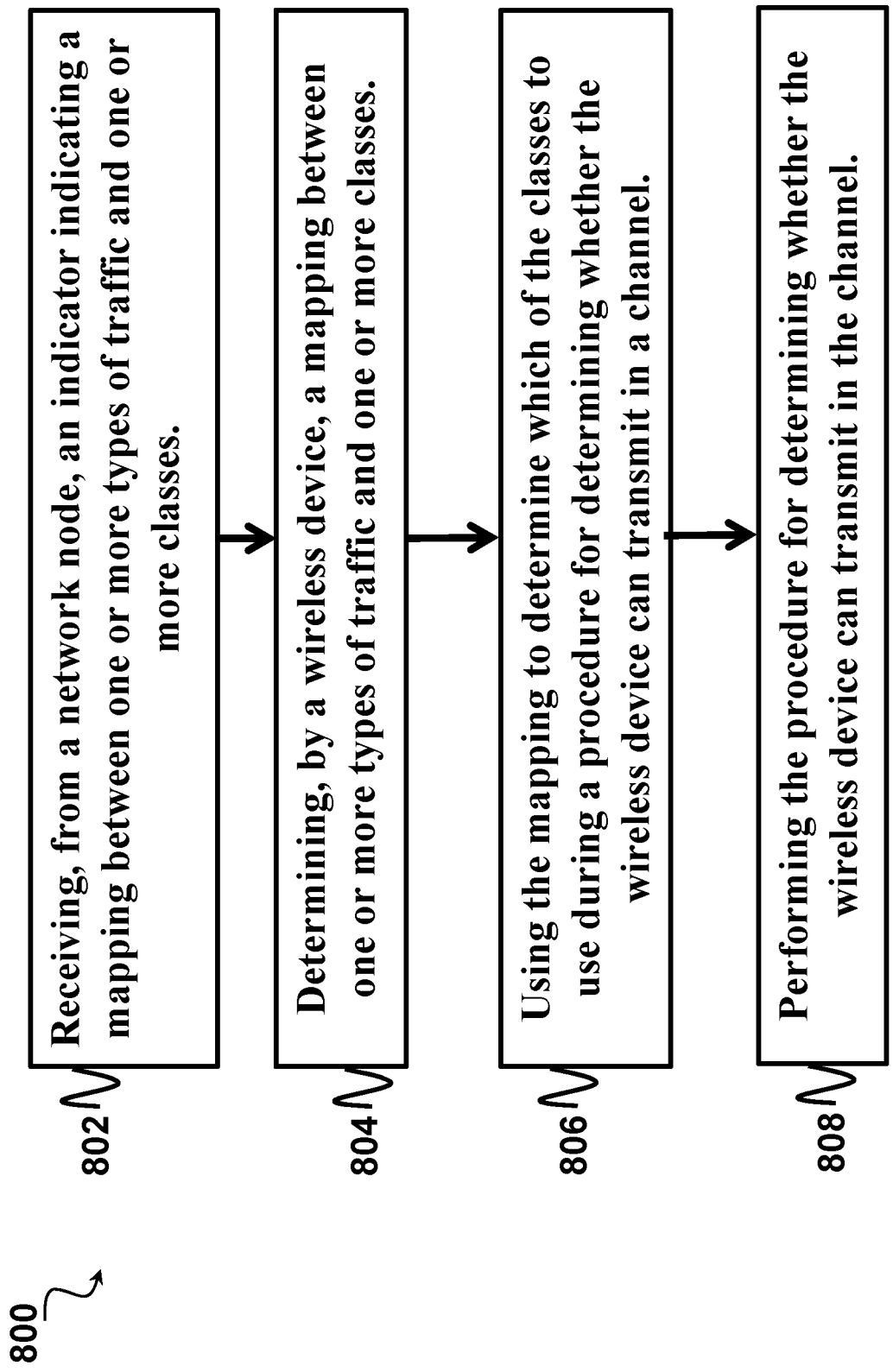

FIG. 8 provides a flow chart illustrating an example of a method in a wireless device (UE 110) for determining a class to use during a procedure, in accordance with certain embodiments of the present disclosure. At step 802, the UE 110 receives an indicator from a network node. The indicator can be received via RRC signaling. The indicator indicates a mapping between one or more types of traffic and one or more classes, such as one or more CAPCs. Examples of indicators are described above with respect to FIG. 5 (step 502), FIG. 6 (step 602), and FIG. 7 (step 706). In certain embodiments, step 802 may be optional.

At step 804, the UE 110 determines a mapping between one or more types of traffic and one or more classes. In certain embodiments, the UE 100 determines the mapping based on the indicator received in step 802. In other embodiments, such as when step 802 is omitted, the UE 100 determines the mapping based on a pre-defined rule for determining a default class. As discussed above, there are a number of possible ways of associating a transmission with a class (such as a CAPC). As a first example, the mapping may associate the one or more classes with one or more bearers, logical channels, or logical channel groups. As a second example, the mapping associates the one or more classes with one or more bearer types. As a third example, the mapping is determined based on quality of service (QoS) requirements (such as according to a QCI to class association).

In certain embodiments, the mapping associates a first class with a first type of traffic, a second class with a second type of traffic, and optionally an $N^{th}$ class with an $N^{th}$ type of traffic. In certain embodiments, the traffic type indicated by the mapping may be based on whether a transmission includes a medium access control (MAC) control element (CE), a certain type of medium access control (MAC) control element (CE) (such as a Buffer Status Report or a Power Headroom Report (PHR)), a radio link control (RLC) protocol data unit (PDU), and/or a packet data convergence protocol (PDCP) control protocol data unit (PDU).

At step 806, the UE 100 uses the mapping to determine which of the classes to use during a procedure for determining whether the UE 100 can transmit in a channel. In certain embodiments, step 806 may comprise one or more steps described above (such as steps 202 and/or 204 of FIG. 2; steps 302 and/or 304 of FIG. 3; steps 402, 404, and/or 406 of FIG. 4; and/or steps 504, 506, and/or 508 of FIG. 5). As described above, the mapping can associate a first class with a first type of traffic and a second class with a second type of traffic. If the first class provides a higher likelihood of acquiring the channel than the second class, the mapping may indicate to use the first class for a transmission that includes both the first type of traffic and the second type of traffic.

At step 808, the UE 110 performs the procedure for determining whether the UE 110 can transmit in the channel, such as a listen-before-talk procedure. In certain embodiments, the listen-before-talk operation is configured for uplink transmissions that use unlicensed spectrum. For example, the listen-before-talk operation can be configured for uplink transmissions that use a secondary carrier of a carrier aggregation configuration, the secondary carrier configured for the uplink transmissions that use unlicensed spectrum.

FIG. 9 is a block diagram of a network 100, in accordance with certain embodiments. Network 100 may include one or more wireless devices 110 (which may interchangeably be referred to as terminals or UEs) and one or more different types of network nodes 115 capable of communicating (directly or indirectly) with wireless devices 110. Wireless devices 110 may communicate with certain network nodes 115 over a wireless interface. Such network nodes 115 may interchangeably be referred to as eNBs, base stations, or radio network nodes, and an area of wireless signal coverage associated with the network node 115 may be referred to as a cell. Wireless device 110A may transmit wireless signals to one or more of network nodes 115, and/or receive wireless signals from one or more of network nodes 115. The wireless signals may contain voice traffic, data traffic, control signals, and/or any other suitable information. Example embodiments of wireless device 110 are described in more detail below with respect to FIGS. 10 and 11 below. Example embodiments of network node 115 are described in more detail below with respect to FIGS. 12 and 13 below.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

Although FIG. 9 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data).

FIG. 10 is a block diagram of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a low-cost and/or low-complexity UE, a sensor, a modem, a machine-type-communication (MTC) device/machine-to-machine (M2M) device, laptop embedded equipment (LEE), laptop mounted equipment (LME), USB dongles, a D2D capable device, customer premises equipment (CPE), a radio communication device, target device, or another device that can provide wireless communication. A wireless device 110 may also be referred to as UE, a station (STA), a device, or a terminal in some embodiments. Wireless device 110 includes a transceiver 10, processing circuitry comprising one or more processors 12, and memory 14. In some embodiments, the transceiver 10 facilitates transmitting wireless signals to and receiving wireless signals from network node 115 (e.g., via an antenna), the processor 12 executes instructions to provide some or all of the functionality described above as being provided by wireless device 110, and the memory 14 stores the instructions executed by the processor 12.

The processor 12 may include any suitable combination of hardware and software implemented in one or more modules to execute instructions and manipulate data to perform some or all of the described functions of wireless device 110, such as the functions of wireless device 110 described above. For example, the processor 12 executes instructions to provide some or all of the functionality related to selecting a class for a transmission (such as any one or more of the steps in FIGS. 2-4 and 8, steps 504, 506, and/or 508 of FIG. 5, and/or steps 604 and/or 606 of FIG. 6). In some embodiments, the processor 12 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the processor 12 may comprise one or more of the modules discussed below with respect to FIG. 11.

The memory 14 is generally operable to store instructions, such as a computer program, software, an application including one or more of logic, rules, algorithms, code, tables, etc. and/or other instructions capable of being executed by a processor 12. Examples of memory 14 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 12 of wireless device 110.

Other embodiments of wireless device 110 may include additional components beyond those shown in FIG. 10 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 12. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

FIG. 11 illustrates example components of wireless device 110, according to certain embodiments. In certain embodiments, one or more components may be implemented using the processor 12 described with respect to FIG. 10. The components include a transmission determination module 16 and a CAPC selection module 18.

In some embodiments, the transmission determination module 16 determines whether a transmission includes a MAC CE, an RLC control PDU, and/or a PDCP control PDU. In certain embodiments, the transmission determination module 16 may further determine type information, such as whether the MAC CE type is BSR or PHR. In certain embodiments, the transmission determination module 16 performs some or all of the functionality described above with respect to FIG. 2 (e.g., step 202), FIG. 3 (e.g., step 302), FIG. 4 (e.g., step 402), FIG. 5 (e.g., step 504), FIG. 6 (e.g., step 604 and/or 606), and/or FIG. 8 (e.g., steps 802, 804, 806, and/or 808).

The CAPC selection module 18 selects a Channel Access Priority Class for the transmission, for example, based on whether the transmission includes a MAC CE, an RLC control PDU, and/or a PDCP control PDU or based on the type information (e.g., BSR or PHR). There may be several possible ways of selecting a CAPC for a transmission. Examples include (1) Bearer/logical channel/logical channel group to CAPC association, (2) Bearer type to CAPC association, (3) QCI to CAPC association, and (4) Mapping between traffic and CAPC (e.g., based on signaling from the network or based on a default CAPC). The CAPC Selection Module 18 may use any one of the preceding techniques or any suitable combination of the preceding techniques. In certain embodiments, the CAPC selection module 18 applies rules for selecting the Channel Access Priority Class. As an example, if a transmission includes a first MAC CE associated with a first CAPC and a second MAC CE associated with a second CAPC, the CAPC selection module may apply a rule that selects the more stringent of the first CAPC and the second CAPC for the transmission. In certain embodiments, the CAPC selection module 18 performs some or all of the functionality described above with respect to FIG. 2 (e.g., step 204), FIG. 3 (e.g., step 304), FIG. 4 (e.g., step 404 and/or 406), FIG. 5 (e.g., step 506 and/or 508), FIG. 6 (e.g., step 604 and/or 606), and/or FIG. 8 (e.g., steps 802, 804, 806, and/or 808).

FIG. 12 is a block diagram of an exemplary network node 115, in accordance with certain embodiments. Network node 115 may be any type of radio network node or any network node that communicates with a UE 110 and/or with another network node. Examples of network node 115 include an eNodeB, a node B, a base station or radio base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), base station controller, network controller, a core network node (e.g., MME, O&M, OSS, SON, coordinating node, positioning node (e.g., E-SMLC), MDT, etc.), an external node (e.g., 3rd party node, a node external to the current network) or any other suitable network node.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of a transceiver 20, processing circuitry comprising one or more processors 22, memory 24, and network interface 26. In some embodiments, the transceiver 20 facilitates transmitting wireless signals to and receiving wireless signals from wireless device 110 (e.g., via an antenna), the processor 22 executes instructions to provide some or all of the functionality described above as being provided by a network node 115, the memory 24 stores the instructions executed by the processor 22, and the network interface 26 communicates signals to backend network components, such as a gateway, switch, router, Internet, Public Switched Telephone Network (PSTN), core network nodes or radio network controllers, etc.

The processor 22 may include any suitable combination of hardware and software implemented in one or more modules to execute instructions and manipulate data to perform some or all of the described functions of network node 115, such as those described above. For example, the processor 22 executes instructions to provide some or all of the functionality related to indicating a mapping to the UE 110 (such as step 502 of FIG. 5, step 602 of FIG. 6, or any one or more of the steps in FIG. 7). In some embodiments, the processor 22 may include, for example, one or more computers, one or more central processing units (CPUs), one or more microprocessors, one or more applications, and/or other logic. In certain embodiments, the processor 22 may comprise one or more of the modules discussed below with respect to FIG. 13.

The memory 24 is generally operable to store instructions, such as a computer program, software, an application including one or more of logic, rules, algorithms, code, tables, etc. and/or other instructions capable of being executed by a processor 22. Examples of memory 24 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 26 is communicatively coupled to the processor 22 and may refer to any suitable device operable to receive input for network node 115, send output from network node 115, perform suitable processing of the input or output or both, communicate to other devices, or any combination of the preceding. The network interface 26 may include appropriate hardware (e.g., port, modem, network interface card, etc.) and software, including protocol conversion and data processing capabilities, to communicate through a network.

Other embodiments of network node 115 may include additional components beyond those shown in FIG. 12 that may be responsible for providing certain aspects of the network node's functionality, including any of the functionality described above and/or any additional functionality (including any functionality necessary to support the solutions described above). The various different types of network nodes 115 may include components having the same physical hardware but configured (e.g., via programming) to support different radio access technologies, or may represent partly or entirely different physical components.

The terminology such as network node and UE should be considered non-limiting and does in particular not imply a certain hierarchical relation between the two. In some embodiments, UEs 110 may have device-to-device (D2D) capability. It may be possible for a first UE 110A in the D2D configuration to perform functionality described as being performed by a network node 115 and for a second UE 110B in the D2D configuration to perform functionality described as being performed by a wireless device 110.

FIG. 13 illustrates example components of network node 115, according to certain embodiments. In certain embodiments, one or more components may be implemented using the processor 22 described with respect to FIG. 12. The components include an indicator generating module 28 and an indicator transmitting module 30. The indictor generating module 28 generates an indicator mapping one or more CAPCs to one or more MAC CEs, RLC control PDUs, and/or PDCP control PDUs. As an example, in certain embodiments the indicator generating module may set a value for the channelAccessPriorityClassForMAC-CEs-r14, the channelAccessPriorityClassForBSR-r14, and/or the channelAccessPriorityClassForPHR-r14 indicators described above. However, any suitable indicator may be used. In certain embodiments, the indicator generating module performs step 702 of FIG. 7.

The indicator transmitting module 30 transmits the indicator to UEs within the coverage area of network node 115. For example, the indicator transmitting module 30 may transmit the indicator via the transceiver 20 described with respect to FIG. 12. In certain embodiments, the indicator transmitting module 30 uses RRC signaling to transmit the indicator. In certain embodiments, the indicator transmitting module 30 transmits the indicator described in FIG. 5 (step 502), FIG. 6 (step 602), and/or FIG. 7 (step 704 and/or 706).

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method in a network node, comprising:
   determining a mapping between one or more types of traffic and one or more classes; and
   communicating an indicator to a wireless device, wherein the indicator indicates to use the mapping to determine which of the classes to use during a procedure for determining whether the wireless device can transmit in a channel;
   wherein the one or more classes comprises a first class that the mapping associates with a first type of traffic and a second class that the mapping associates with a second type of traffic;
   wherein the first class provides a higher likelihood of acquiring the channel than the second class; and
   wherein the indicator indicates to use the first class for a transmission that includes both the first type of traffic and the second type of traffic.

2. The method of claim 1, wherein the class is a channel access priority class.

3. The method of claim 1, wherein the procedure is a listen-before-talk procedure.

4. The method of claim 1, wherein the mapping associates the one or more classes with one or more bearers, logical channels, or logical channel groups.

5. The method of claim 1, wherein the mapping associates the one or more classes with one or more bearer types.

6. The method of claim 1, wherein the mapping is determined based on quality of service (QoS) requirements.

7. The method of claim 1, wherein the indicator is communicated in response to determining to override a default class.

8. The method of claim 1, wherein the mapping maps at least one of the classes to a type of traffic comprising at least one of: a medium access control (MAC) control element (CE), a certain type of MAC CE, a radio link control (RLC) protocol data unit (PDU), or a packet data convergence protocol (PDCP) control PDU.

9. The method of claim 1, wherein the procedure is a listen-before-talk procedure and listen-before-talk operation is configured for uplink transmissions that use unlicensed spectrum.

10. The method of claim 1, wherein the procedure is a listen-before-talk procedure and listen-before-talk operation is configured for uplink transmissions that use a secondary carrier of a carrier aggregation configuration, the secondary carrier configured for the uplink transmissions that use unlicensed spectrum.

11. The method of claim 1, wherein the indicator is communicated via radio resource control (RRC) signaling.

12. A method in a wireless device, comprising:
   determining a mapping between one or more types of traffic and one or more classes;
   using the mapping to determine which of the classes to use during a procedure for determining whether the wireless device can transmit in a channel; and
   performing the procedure for determining whether the wireless device can transmit in the channel;
   wherein the one or more classes comprises a first class that the mapping associates with a first type of traffic and a second class that the mapping associates with a second type of traffic;
   wherein the first class provides a higher likelihood of acquiring the channel than the second class; and
   wherein the indicator indicates to use the first class for a transmission that includes both the first type of traffic and the second type of traffic.

13. The method of claim 12, wherein the class is a channel access priority class.

14. The method of claim 12, wherein the procedure is a listen-before-talk procedure.

15. The method of claim 12, wherein the mapping associates the one or more classes with one or more bearers, logical channels, or logical channel groups.

16. The method of claim 12, wherein the mapping associates the one or more classes with one or more bearer types.

17. The method of claim 12, wherein the mapping maps at least one of the classes to a type of traffic comprising at least one of: a medium access control (MAC) control element (CE), a certain type of MAC CE, a radio link control (RLC) protocol data unit (PDU), or a packet data convergence protocol (PDCP) control PDU.

18. The method of claim 12, wherein the procedure is a listen-before-talk procedure and listen-before-talk operation is configured for uplink transmissions that use unlicensed spectrum.

19. The method of claim 12, wherein the procedure is a listen-before-talk procedure and listen-before-talk operation is configured for uplink transmissions that use a secondary carrier of a carrier aggregation configuration, the secondary carrier configured for the uplink transmissions that use unlicensed spectrum.

20. The method of claim 12, wherein the mapping is determined based at least in part on an indicator received from a network node.

21. The method of claim 20, wherein the indicator is received via radio resource control (RRC) signaling.

22. The method of claim 12, wherein the mapping is determined based on quality of service (QoS) requirements.

23. A network node comprising processing circuitry operable to:
   determine a mapping between one or more types of traffic and one or more classes; and
   communicate an indicator to a wireless device, wherein the indicator indicates to use the mapping to determine which of the classes to use during a procedure for determining whether the wireless device can transmit in a channel;
   wherein the one or more classes comprises a first class that the mapping associates with a first type of traffic and a second class that the mapping associates with a second type of traffic;
   wherein the first class provides a higher likelihood of acquiring the channel than the second class; and
   wherein the indicator indicates to use the first class for a transmission that includes both the first type of traffic and the second type of traffic.

24. The network node of claim 23, wherein the class is a channel access priority class.

25. The network node of claim 23, wherein the procedure is a listen-before-talk procedure.

26. The network node of claim 23, wherein the mapping associates the one or more classes with one or more bearers, logical channels, or logical channel groups.

27. The network node of claim 23, wherein the mapping associates the one or more classes with one or more bearer types.

28. The network node of claim 23, wherein the mapping is determined based on quality of service (QoS) requirements.

29. The network node of claim 23, wherein the indicator is communicated in response to determining to override a default class.

30. The network node of claim 23, wherein the mapping maps at least one of the classes to a type of traffic comprising at least one of: a medium access control (MAC) control element (CE), a certain type of MAC CE, a radio link control (RLC) protocol data unit (PDU), or a packet data convergence protocol (PDCP) control PDU.

31. The network node of claim 23, wherein the procedure is a listen-before-talk procedure and listen-before-talk operation is configured for uplink transmissions that use unlicensed spectrum.

32. The network node of claim 23, wherein the procedure is a listen-before-talk procedure and listen-before-talk operation is configured for uplink transmissions that use a secondary carrier of a carrier aggregation configuration, the secondary carrier configured for the uplink transmissions that use unlicensed spectrum.

33. The network node of claim 23, wherein the indicator is communicated via radio resource control (RRC) signaling.

34. A wireless device comprising processing circuitry operable to:
   determine a mapping between one or more types of traffic and one or more classes;
   use the mapping to determine which of the classes to use during a procedure for determining whether the wireless device can transmit in a channel; and
   perform the procedure for determining whether the wireless device can transmit in the channel;
   wherein the one or more classes comprises a first class that the mapping associates with a first type of traffic and a second class that the mapping associates with a second type of traffic;
   wherein the first class provides a higher likelihood of acquiring the channel than the second class; and
   wherein the indicator indicates to use the first class for a transmission that includes both the first type of traffic and the second type of traffic.

35. The wireless device of claim 34, wherein the class is a channel access priority class.

36. The wireless device of claim 34, wherein the procedure is a listen-before-talk procedure.

37. The wireless device of claim 34, wherein the mapping associates the one or more classes with one or more bearers, logical channels, or logical channel groups.

38. The wireless device of claim 34, wherein the mapping associates the one or more classes with one or more bearer types.

39. The wireless device of claim 34, wherein the mapping maps at least one of the classes to a type of traffic comprising at least one of: a medium access control (MAC) control element (CE), a certain type of MAC CE, a radio link control (RLC) protocol data unit (PDU), or a packet data convergence protocol (PDCP) control PDU.

40. The wireless device of claim 34, wherein the procedure is a listen-before-talk procedure and listen-before-talk operation is configured for uplink transmissions that use unlicensed spectrum.

41. The wireless device of claim 34, wherein the procedure is a listen-before-talk procedure and listen-before-talk operation is configured for uplink transmissions that use a secondary carrier of a carrier aggregation configuration, the secondary carrier configured for the uplink transmissions that use unlicensed spectrum.

42. The wireless device of claim 34, wherein the mapping is determined based at least in part on an indicator received from a network node.

43. The wireless device of claim 42, wherein the indicator is received via radio resource control (RRC) signaling.

44. The wireless device of claim 34, wherein the mapping is determined based on quality of service (QoS) requirements.

\* \* \* \* \*